United States Patent [19]
Beethe

[11] Patent Number: 5,313,575
[45] Date of Patent: May 17, 1994

[54] PROCESSING METHOD FOR AN ICONIC PROGRAMMING SYSTEM

[75] Inventor: Douglas C. Beethe, Loveland, Colo.

[73] Assignee: Hewlett-Packard Company, Palo Alto, Calif.

[21] Appl. No.: 63,102

[22] Filed: May 14, 1993

Related U.S. Application Data

[63] Continuation of Ser. No. 537,550, Jun. 13, 1990, abandoned.

[51] Int. Cl.[5] .............................................. G06F 15/60
[52] U.S. Cl. ................................................... 395/159
[58] Field of Search ............................... 395/153-161, 395/700, 140; 364/474.24, 488-491; 340/709-710, 723

[56]  References Cited

U.S. PATENT DOCUMENTS

| | | | |
|---|---|---|---|
| 4,315,315 | 2/1982 | Kossiakoff | 395/140 |
| 4,455,619 | 6/1984 | Masui et al. | 395/160 |
| 4,546,435 | 10/1985 | Herbert et al. | 395/700 |
| 4,813,013 | 3/1989 | Dunn | 395/159 |
| 4,827,404 | 5/1989 | Barstow et al. | 395/161 |
| 4,901,221 | 2/1990 | Kodosky et al. | 364/200 |
| 4,914,568 | 4/1990 | Kodosky et al. | 395/159 |
| 4,939,672 | 7/1990 | Meadows | 395/159 |
| 4,956,773 | 9/1990 | Saito et al. | 395/159 |

FOREIGN PATENT DOCUMENTS 0231594  8/1987  European Pat. Off. ....... G06F 9/44

OTHER PUBLICATIONS

Chang, Shi-Kuo, "Visual Languages: A Tutorial and Survey", IEEE Software, Jan. 1987, pp. 29-39.
Halasz et al, "Notecards in a Nutshell", ACM, 1987, pp. 45-52.
Myers, Brad A., "The State of the Art in Visual Programming, and Program Visualization", CMV, Feb. 1988, pp. 1-25.
Raeder, Georg, "A Survey of Current Graphical Programming Techniques", IEEE Computer, Aug. 1985, pp. 11-25.
Icons configure DOS-based data-acq, analysis packages without user code article; Personal Engineering & Instrumentation News, Apr. 1990; pp. 25-27.
Labview 2-The Complete Instrumentation Software System Brochure by National Instruments, 1990.
*Programming With Pictures*, Jeff Kodosky and Bob Dye, Computer Language Magazine, Jan. 1989, pp. 61-69.
Labview Product Description, National Instruments Corp., Austin, Tex., 1987.
Vose, Michael G. and Williams, Gregg, "Labview: Laboratory Virtual Instrument Engineering Workbench", Byte Magazine, Sep. 1986, pp. 84-92.

*Primary Examiner*—Gary V. Harkcom
*Assistant Examiner*—John E. Breene

[57] ABSTRACT

An iconic programming system wherein each icon within the system may have zero or more data input connections, zero or more data output connections, an optical sequence input connection, and an optional sequence output connection. Each of these connections may be used to graphically connect each icon to another icon to form a network of icons that operates as a computer program. Execution of the network is accomplished by processing each icon and performing any programming functions represented by the icon. After an icon is processed, data resulting from the processing is sent to all icons connected to data or sequence output connections, and those icons are scheduled for processing. Any start icons in the network are scheduled to process first. If an icon is scheduled for processing and it does not have data available to an input, the icon connected to that input is scheduled.

13 Claims, 9 Drawing Sheets

PROCESSING METHOD FOR AN ICONIC PROGRAMMING SYSTEM

This is a continuation of copending application Ser. No. 07/537,550 filed on Jun. 13, 1990, now abandoned.

This application is related to application Ser. No. 07/483,478, entitled Programming Escape from and Iconic System, filed Feb. 22, 1990, and assigned to the same entity now abandoned.

FIELD OF THE INVENTION

This invention relates to computer systems and more particularly to Iconic Programming Systems. Even more particularly, the invention relates to determining the order of processing each icon in such a system.

BACKGROUND OF THE INVENTION

An iconic programming system is a "programmingless" environment where programming is done by connecting graphical images of tools (icons), together with connecting lines, to form a directed graph and create an iconic network which represents a software program. The iconic programming system may be used in research and development test environments, where several different electronic instruments are connected to test a system or device. Programming such a system requires instructions to cause the various instruments to perform desired functions in order to operate as a system.

When an iconic programming system is used, each instrument will be represented by a graphical icon, also called a graphical object, and the connections between the instruments are represented by lines between the graphical images. In addition to graphical icons representing instruments in such a system, graphical icons are provided for programming functions, for example looping, IF-THEN statements, etc. By combining instrument and programming icons, a user can create an iconic network involving the programmed operation of several instruments.

Iconic systems are designed to process without a particular order as to which icons process before other icons, except that an icon will not process until all data necessary for its processing is available. When all data is available to several icons, they may process simultaneously. In order to construct iconic systems that function with real world instruments, and which function on a single processor, the icons must process is some defined order. One definition of the order for processing icons is supplied by the conventional rules associated with data flow diagrams.

U.S Pat. No. 4,901,221 issued Feb. 13, 1990 to Kodosky, et al., and assigned to National Instruments, Inc., is an example of an iconic system which follows the conventional rules associated with data flow diagrams.

An important limitation of such a system, however, is that the conventional rules of data flow diagrams require that iteration operations occur at a sublevel which contains the iteration icon, and thus any data required within the iteration must be passed to the sublevel by means of formal parameters. For instance, a given program network may have three levels, such as a level 3 FOR-loop is nested inside a level 2 FOR-loop which is nested inside a level 1 FOR-loop, such that the icon for level 1 includes the icon for level 2 which includes the icon for level 3. Iteration at, and passage of data to, a given level is restricted, according to the rules of conventional data flow diagrams, to the level and those below it. Thus, iterating at the level 2 FOR-loop would restrict the user to accessing and viewing only the level 2 and level 3 FOR-loops. Iteration and a complete view of the highest level FOR-loop (level 1) would be restricted. Thus the user is restricted, in iterating and passing data, to the level whose icon is most visually manifest. This is a major limitation of prior art iconic programming systems which adhere to the conventional rules of data flow diagrams.

There is a need in the art for a method for defining the order of processing of icons in an iconic programming system that allows processing of iterations while allowing the icons of all iterations to appear at the same level of an iconic network.

SUMMARY OF THE INVENTION

The present invention overcomes this major limitation of the prior art iconic programming systems which use classical dataflow rules by providing a processing method that allows a user to collapse iterations in an iconic programming network to a single "level" so that all the icons within iterations can be visible simultaneously.

In addition, it is an aspect of the present invention to provide a method for processing icons in an iconic programming system.

Another aspect of the invention is to report an error and discontinue processing if all input pins of an icon are not connected.

Another aspect is to allow only one connection to an input pin of an icon.

Another aspect is to process an icon only after such icon has received input on all input data pins and any sequence input pins.

Still another aspect of the invention is to process a selected icon, send data to all downstream icons connected to the selected icon's data outputs, process all downstream icons that have sufficient input data to allow processing, and then send a sequence signal to the selected icon's sequence output.

A further aspect of the invention is to consider a second icon connected to a first icon to be on the same thread as the first icon.

A further aspect of the invention to process such icons in a breath-first manner.

A further aspect is to insure no order of processing for icons connected in parallel.

A further aspect is to pull processing of icons across data connections and across sequence connections.

A further aspect is to process an icon having no input connections only when such icon is pulled, unless no start icon is present on the thread containing the icon, wherein such icon may be processed at an undefined time during the execution of the thread.

A further aspect is to require a start icon in a thread only when such thread has a feedback loop.

A further aspect is to allow multiple start icons in a thread, wherein all such start icons will be processed before any other icons on the thread.

A further aspect is to process parallel threads in round-robin style with each thread processing one primitive icon per cycle.

A still further aspect of the invention is to treat all icons downstream of an iteration icon as a virtual thread and to repeat processing of such virtual thread with each iteration.

The above and other aspects of the invention are accomplished in an iconic programming system process wherein each icon within the process may have zero or more data input connections, zero or more data output connections, an optional sequence input connection, and an optional sequence output connection. Each of these connections may be used to connect the icon to another icon.

When a user starts execution of the iconic system, the system first separates the icons into a list of threads. This list is formed by selecting one of the icons at the top level of the directed graph, and placing that icon, along with all icons connected to it, into the first thread. If any icons remain in the top level, a next unconnected icon is selected and all icons connected to it are placed in a second thread. This process continues until all icons within the top level of the directed graph have been placed in a thread. Icons at lower levels of the graph, such as icons within subprograms, will be placed on a thread when the subprogram is started.

A pending queue and a done stack are then created for each of the threads. Each of the threads is then examined to locate any start icons within the thread. If one or more start icons are found within a thread, the start icons are scheduled by placing them onto the pending queue to start execution. If the thread contains no start icons, it is examined to determine whether it contains an feedback loops. If feedback loops are present and the thread contains no start icons, an error message is displayed and execution stops. If no feedback loops are present, and no start icons are present, all the icons of the thread are placed on the pending queue in a random order. Once the pending queues have been established, execution starts by selecting the first icon in the pending queue of the first thread within the system.

If the selected icon has a sequence input, processing of the icon will only occur if a signal has been received on the sequence input. If the selected icon does not have a sequence input, it will be processed only after data input has been received on all data input connections. If data is not available on one or more of its data or sequence inputs, processing will not proceed, however, all icons needing to supply data will be placed on the pending queue for execution.

If a selected icon is an iteration icon, all icons connected to the data output connections of the icon are copied into a virtual thread. The thread containing the iteration icon is then blocked from executing, and the virtual thread is placed on the list of threads for execution. This virtual thread is then processed to completion, all the icons deleted from the thread, and the iteration thread is unblocked. The iteration icon will then repeat with a new iteration value and again copy all the icons connected to its data output connections to a virtual thread, which is then executed. This process continues until the iteration icon has completed all iterations.

After the icon has been processed, it is placed on the done stack for the thread and the system processes one icon from the next thread in the list of threads. After all threads have processed one icon, the system will return to the first thread to continue in a round-robin manner.

If the pending queue for a thread is empty, the system examines the done stack of the thread. The system will pop the top icon from the done stack and send a sequence signal to all icons connected to the sequence output of the icon, if any. Each of these connected icons will then be placed on the pending queue for execution.

When the pending queue and the done stack are both empty, processing for the thread is complete. After processing all threads, execution of the iconic system is complete.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
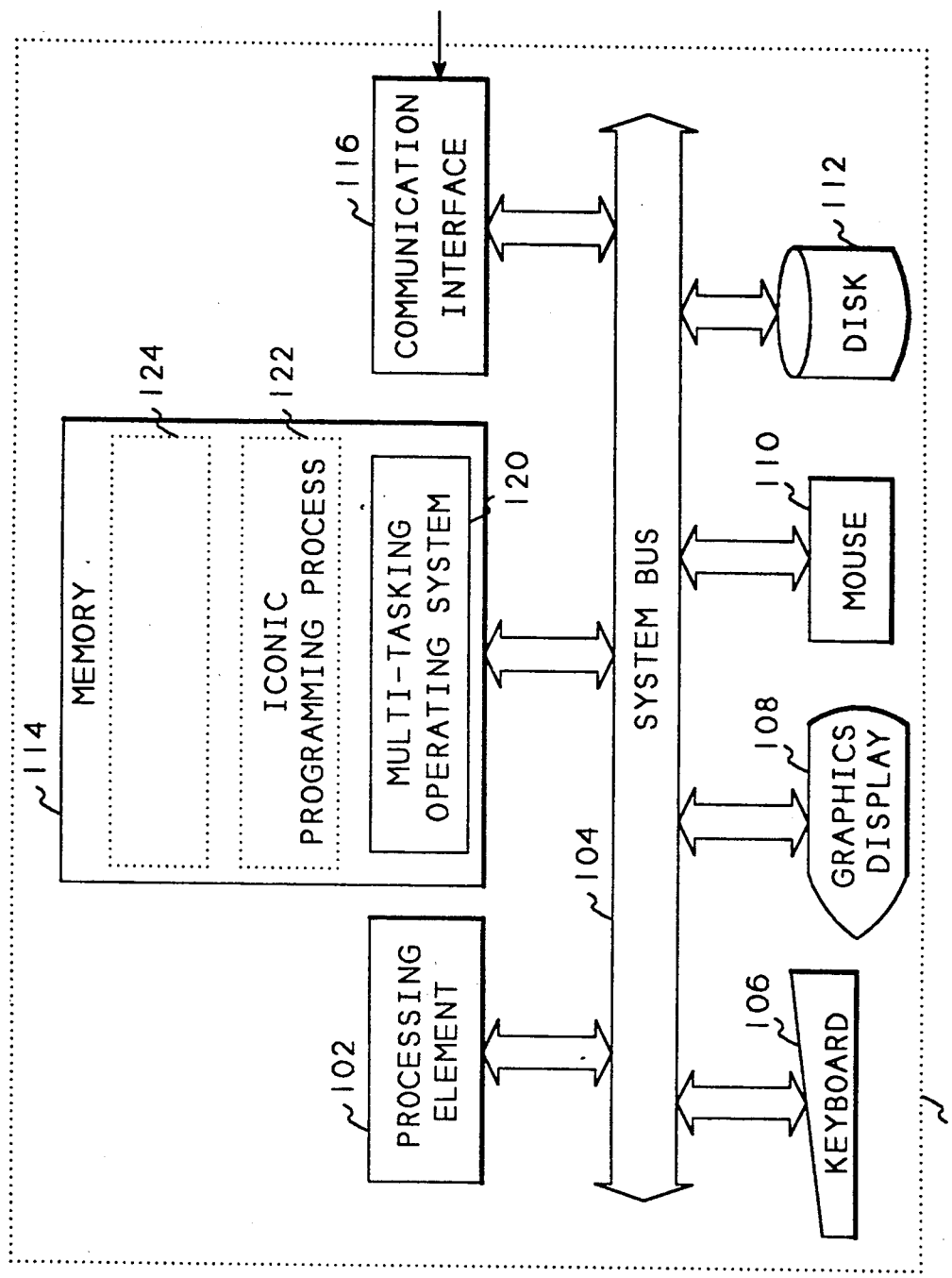
FIG. 1 shows a block diagram of a computer system incorporating the present invention.

FIG. 1 shows a block diagram of a computer system incorporating the present invention. Referring now to FIG. 1, a computer system 100 contains a processing element 102 which connects to the other components of the system through a system bus 104. A keyboard 106 allows a user to input textual data to the system, and a mouse 110 allows a user to input graphical data to the system. A graphics display 108 allows the system to output text and graphical information to the user. A disk 112 is used by the system to store the software of the iconic programming system environment, as well as the user-defined iconic network. A communications interface 116 is used to create a communications network which allows the computer and iconic programming environment to communicate with other computers and other environments. Memory 114 is used to contain the software and user data of the iconic programming environment. A multi-tasking operating system 120 can have a plurality of tasks, also called processes, here illustrated by task 122 and task 124. Task 122 is shown containing the iconic programming process of the present invention.

Figure 2:
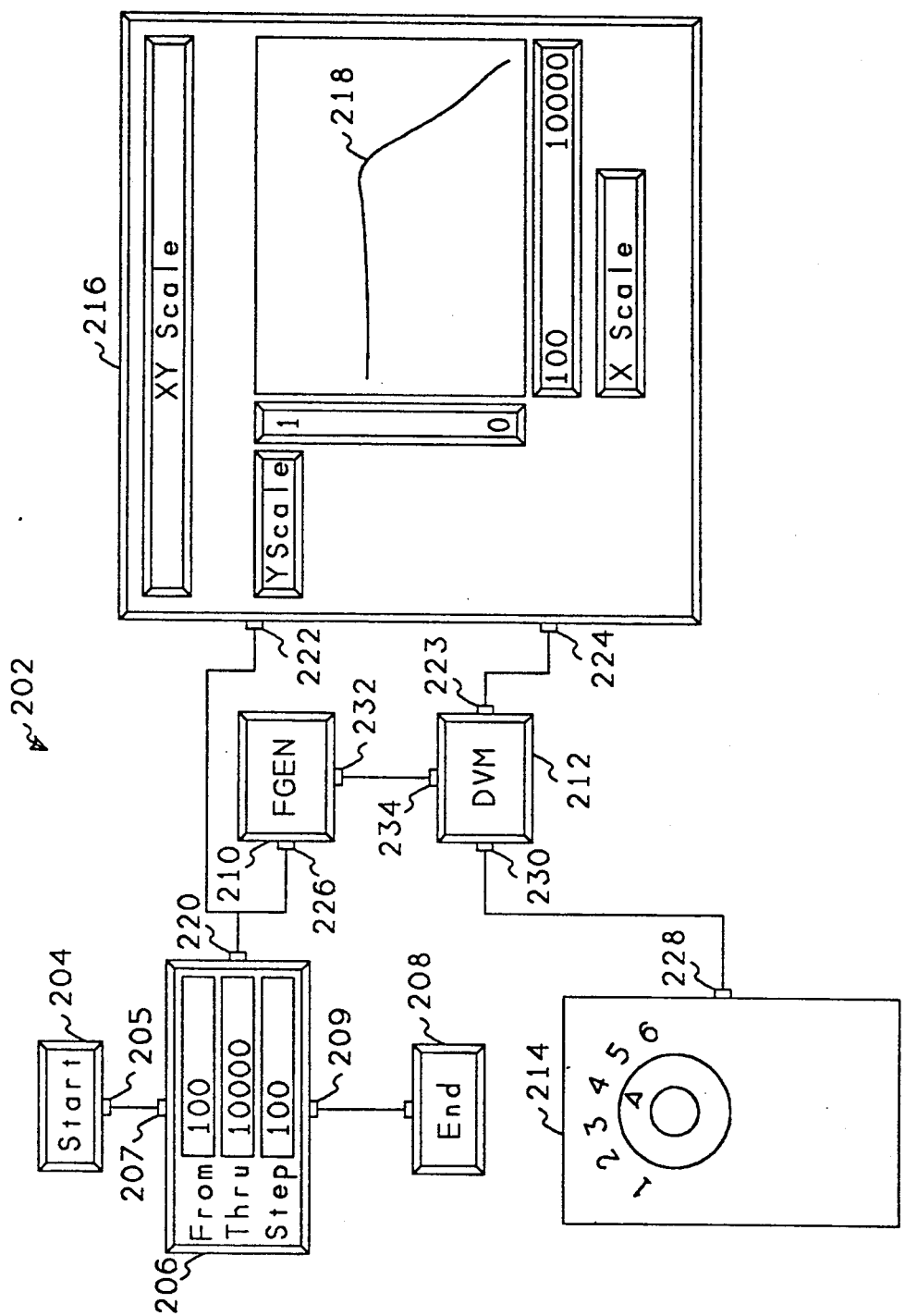
FIG. 2 shows an iconic network for testing an audio filter.

FIG. 2 shows a iconic network for testing an audio filter. Referring now to FIG. 2, iconic network 202, which is a directed graph, is comprised of a start icon 204 having its sequence output 205 connected to the sequence input 207 of an iteration icon 206. The sequence output 209 of the iteration icon 206 connects to an end icon 208. The data output 220 of the iteration icon 206 connects to the data input 226 of a frequency generator 210. The data output 220 also connects to the X input 222 of an X-Y display 216. A sequence output 232 of the frequency generator icon 210 connects to a sequence input 234 of a digital voltmeter 212. The digital voltmeter icon 212 has a data input 230 coming from the data output 228 of a range selector switch 214. The data output 223 of the digital voltmeter is connected to the Y input 224 of the X-Y display 216.

The FGEN icon 210 represents a real external sweep frequency generator which is connected to the input of the audio filter being tested (not shown). The digital voltmeter icon 210 represents an external real digital voltmeter connected to the output of the audio filter being tested. When the start icon 204 is activated, it will send a sequence signal to the iteration icon 206 which will start through an iteration loop. During the first iteration, the iteration icon 206 will send a data value of one hundred over the data output 220 to the frequency generator 210. This will cause the real frequency generator that is connected to the audio filter to output a frequency of one hundred hertz. After the frequency generator has output the one hundred hertz signal, it will inform the FGEN icon 210 that the signal has been output and the FGEN icon 210 will send a sequence signal over the sequence output 232 to the sequence input of the digital voltmeter icon 212. The digital voltmeter icon 212 will obtain a range setting from the range switch 214 and send a signal to the external digital voltmeter to cause it to read the output of the audio filter being tested. The output read by the external digital voltmeter will be sent over the data output 223 to the Y input 224 of the X-Y display. The X-Y display, since it has received an X input of one hundred hertz on data input 222 and a Y input on 224 consisting of the digital voltmeter reading, will plot one point on the X-Y display. After this first iteration is complete, the iteration icon 206 will step the frequency by one hundred hertz and output a frequency of two hundred hertz on data output 220. The steps described above will operate in the same sequence, and a second plot point will be plotted on the X-Y display 216. This will continue until the iteration icon 206 has reached a frequency of ten thousand hertz. At that point, the number of points being plotted will result in the graph 218 on the X-Y display. The iteration icon 206 will then send a sequence signal to end icon 208 and processing will terminate.

Table 1 shows the icon device rules that all icons on graphical network must obey. Table 2 shows the rules involved in processing the icons on a particular thread within a graphical network. These rules will be better illustrated in the following flowcharts which describe the process of analyzing and executing the icons on a graphical network.

Figure 3:
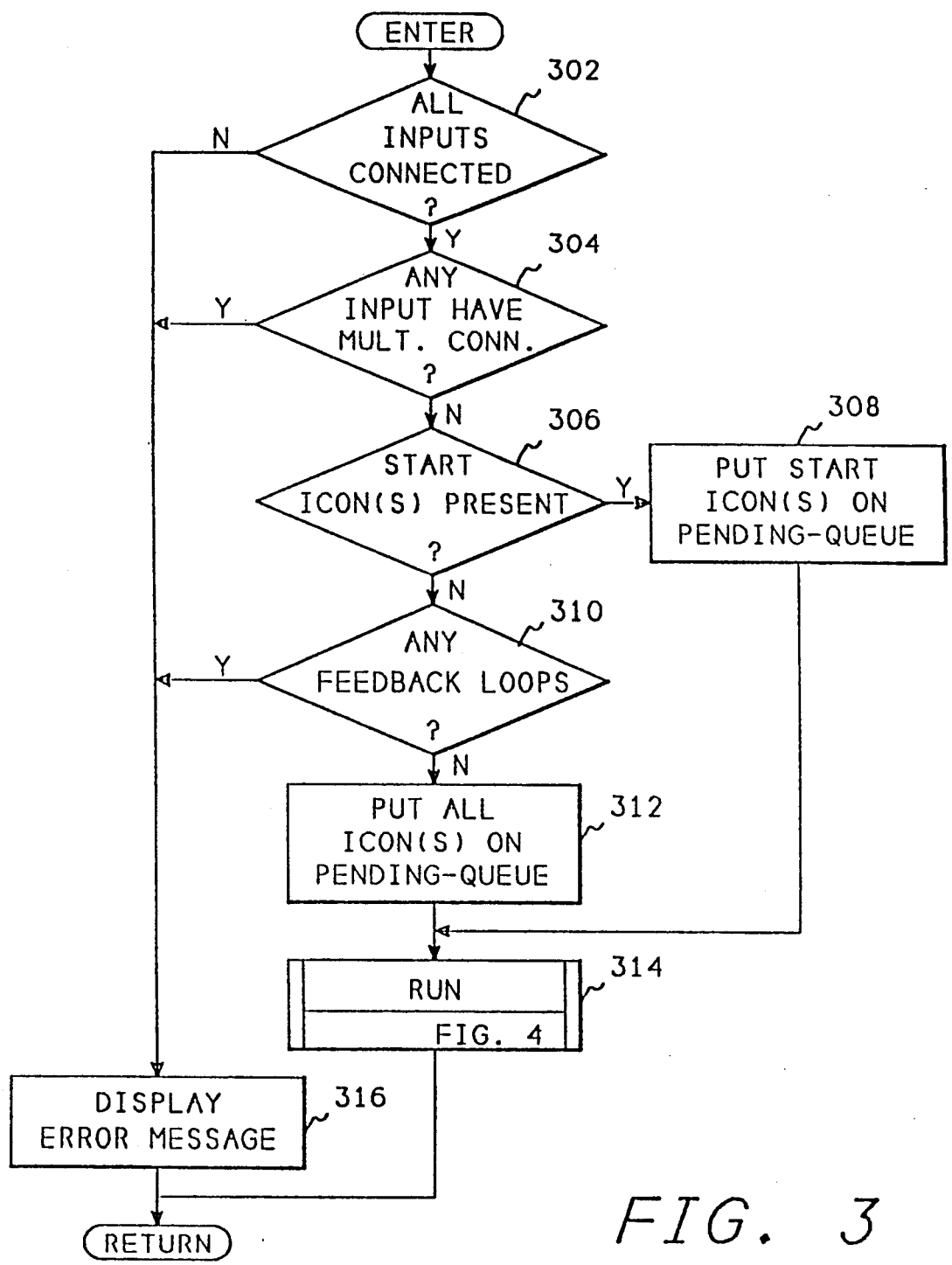
FIG. 3 shows a flowchart of the pre-run process.
Figure 4:
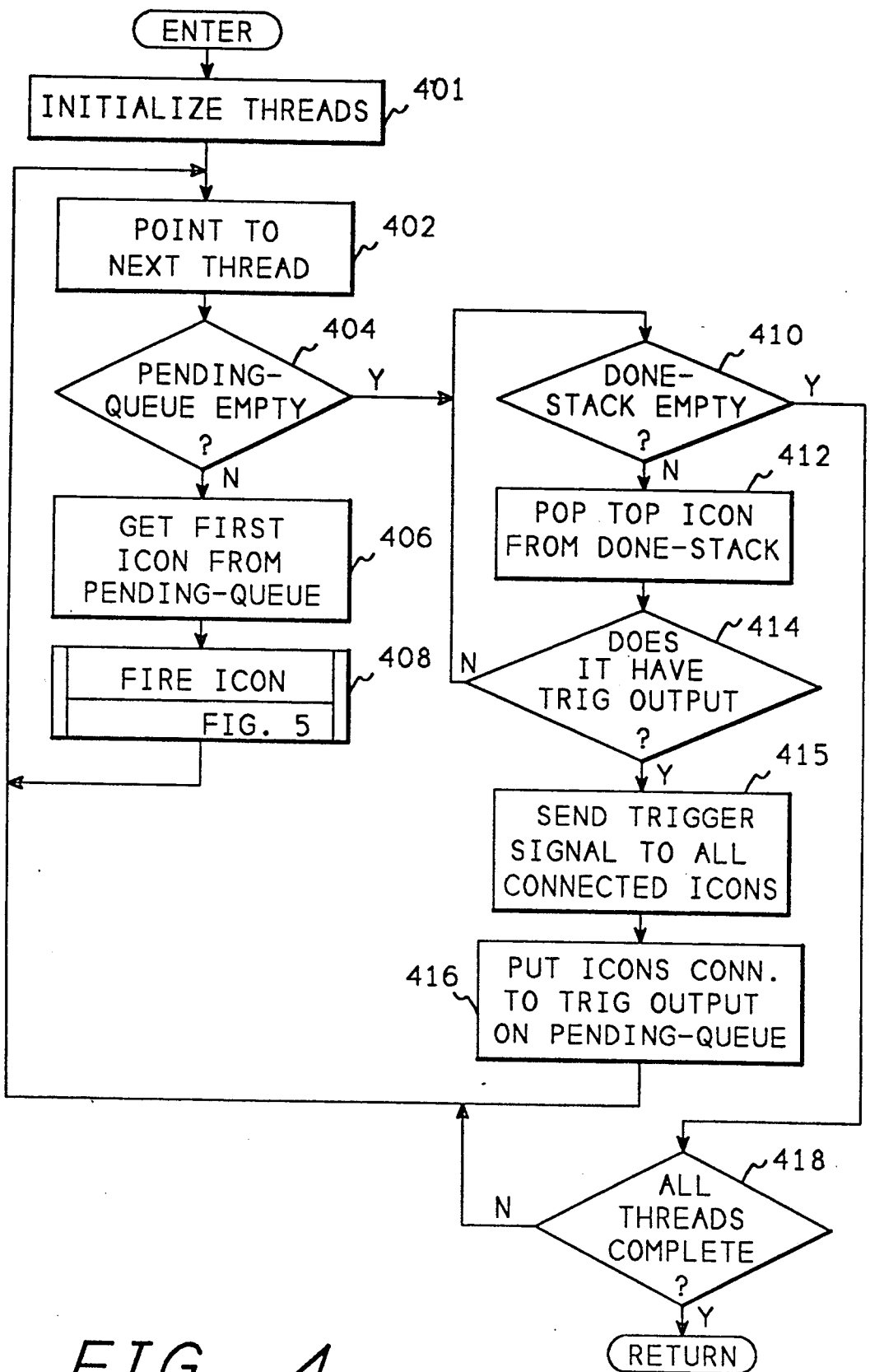
FIG. 4 shows a flowchart of the run process.

FIG. 3 shows a flowchart of the pre-run process of the present invention. This flowchart will be called whenever a user enters a run command, or uses the graphical input device 110 (FIG. 1) to "push" a start icon on a graphical network. Referring now to FIG. 3, after entry, block 302 determines whether all input pins of all icons have been connected, in order to satisfy Icon Device Rule 1 (Table 1). If any input is unconnected, block 302 transfers to block 316 which displays an error message and returns. If all input pins are connected, block 302 transfers to block 304 which determines whether any inputs have multiple connections, in order to determine whether rule 2 of the Icon Device Rules (Table 1) has been satisfied. If any input has multiple connections, block 304 transfers to block 316 which displays an error message before returning. If no input pin has more than one connection, block 304 transfers to block 306 which determines whether any start icons are present in the graphical network. If any start icons are present, block 306 transfers to block 308 which schedules the start icons by placing them in the pending queue of their respective threads in order to satisfy the part of Thread Rule 6 (Table 2) that states that all starts must fire (process) before any other devices on the thread. If no start icons are present, block 306 transfers to block 310 which checks to determine if any feedback inputs exist for any icons. Since block 306 already determined that no start icons were present, if any feedback inputs exist, block 310 will transfer to block 316 to display an error message, in order to satisfy Thread Rule 5 ( Table 2). If no feedback inputs are present, block 310 transfers to block 312. Since no start icon was found on the graph, and no feedback loops were found on the graph, block 312 will place all the icons on the graph on the start queue at the same time, in order to satisfy Thread Rule 7 (Table 2). Block 312 then transfers to block 314 which calls FIG. 4 to process the icons within the graph. FIG. 4 will return after the graphical network has been completely processed and block 314 will then return to the caller.

FIG. 4 shows a flowchart of the run process. This process is called by FIG. 3 after FIG. 3 has determined that the graph is capable of being processed. Referring now to FIG. 4, after entry, block 401 will initialize the threads and reset all the processed flags, indicating that the icons have not yet fired. Block 402 will then point to the first thread within the graphical network. Each thread on the graphical network has its own pending queue and its own done stack, and these two data structures determine which icon will be processed next within a graph. In order to satisfy Thread Rule 8, if more than one thread exists on a graphical network, the threads will be processed in a round-robin style, with one icon being processed on each thread with each cycle. After pointing to the first, or next thread, block 402 transfers to block 404 which determines whether the pending queue for that thread is empty. If the pending queue is not empty, block 404 transfers to block 406 which gets the first icon from the pending queue for the thread. Block 408 then calls FIG. 6 to process (fire) the icon just retrieved from the pending queue. After that icon has been processed, FIG. 6 returns to block 402 which points to the next thread.

If the pending queue for a particular thread is empty, block 404 will transfer to block 410 which determines whether the done stack for that thread is empty. If the done stack is not empty, block 410 transfers to block 412 which pops the top icon from the done stack and then block 414 determines whether the icon has a sequence output. If the icon has no sequence output, block 414 returns to block 410 which checks the stack again. If the icon does have a sequence output, block 414 transfers to block 415 which sends a sequence signal to all icons connected to the sequence output and then block 416 takes each of the icons connected to the sequence output and places them on the pending queue for the thread. This block satisfies Device Rule 5 (Table 1) by firing the sequence output of all icons after propagation has continued along the standard output lines as far as possible. If block 410 determines that the done stack for a particular thread is empty, it transfers to block 418 which checks to see if all threads have been completely processed. If any thread remains to be processed, block 418 returns to block 402 to continue processing that thread. After all threads are complete, block 418 returns to FIG. 3.

Figure 5:
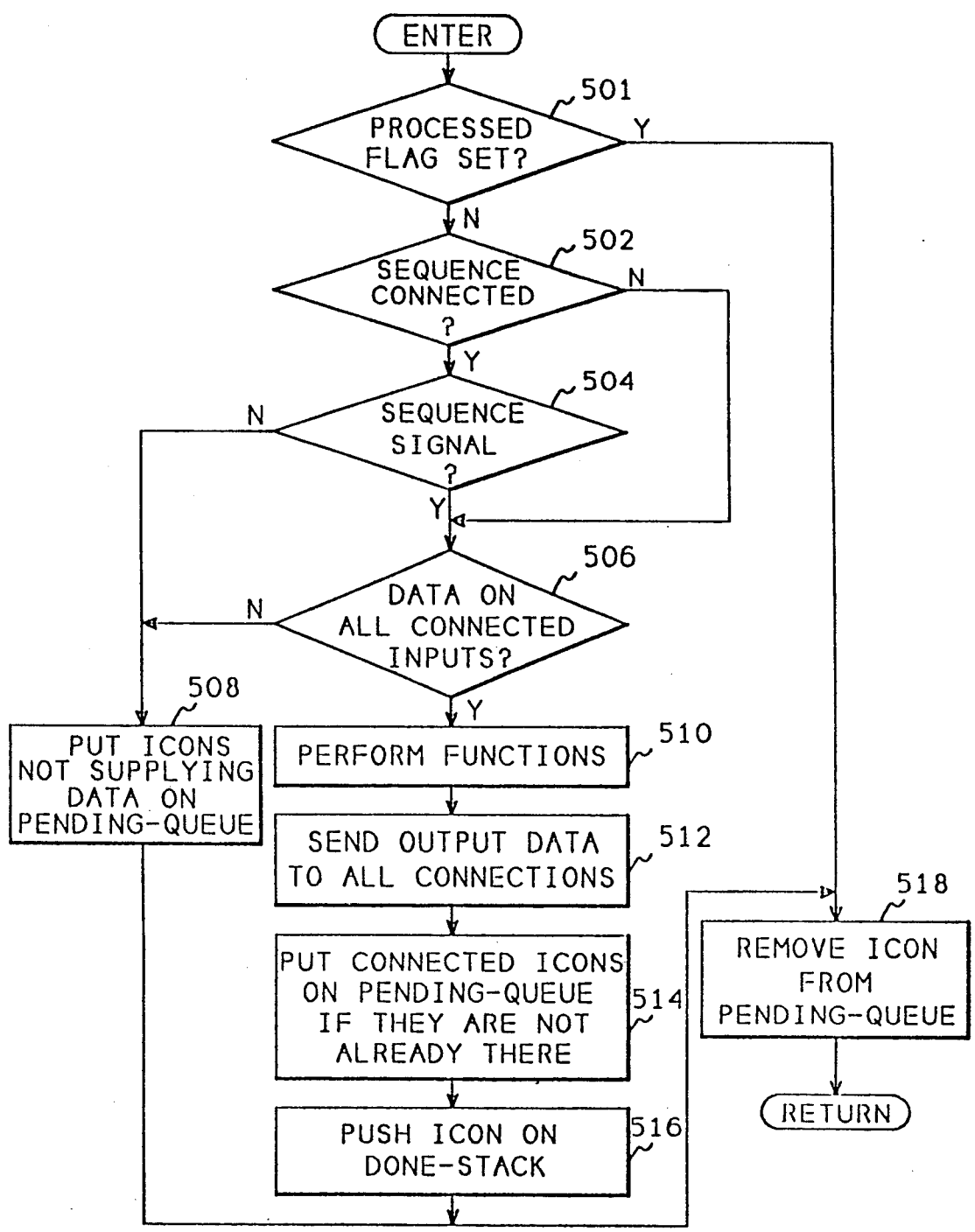
FIG. 5 shows a flowchart of the method of processing (firing) an icon.

FIG. 5 shows a flowchart of the method of processing (firing) an icon. Referring now to FIG. 5, after entry, block 501 checks the processed flag and if it is set, control goes to block 518, since an icon will only process once. If the processed flag is not set, block 501 transfers to block 502 which determines whether the sequence input to the icon is connected. If the sequence input is connected, Device Rule 4 (Table 1) states that the device can process (execute) only if a signal has been received on the sequence input. Therefore, if a sequence input is connected, block 502 transfers to block 504 to determine whether a signal has been received on the sequence input. If a signal has not been received on the sequence input, this icon cannot be processed, so block 504 transfers to block 508 which puts the icon not supplying the sequence signal on the pending-queue and then transfers to block 518 which removes the icon from the pending queue before returning to FIG. 4. If a sequence signal has been received, block 504 transfers to block 506.

If the sequence input is not connected, block 502 transfers to block 506 which determines whether data has been received on all input data pins, in order to determine whether Device Rule 3 has been satisfied. If data has not been received on one or more input pins, block 506 transfers to block 508. Block 508 will attempt to "pull" icons that have not yet supplied data, in order to satisfy Thread Rule 3. This pulling is accomplished by placing all icons that have not supplied data to this icon into the pending queue for the thread. Block 508 then transfers to block 518 which removes the icon from the pending queue. This icon will reappear on the pending queue after the icons being "pulled" have been processed.

If data has been received on all input pins block 506 will transfer to block 51 which performs the functions of the icon. Also, if a signal has been received on the sequence input, block 504 will transfer to block 510. If the icon is an iteration icon, block 510 will create a virtual thread for all icons connected to the data output of the iteration icon. The thread containing the iteration icon will be blocked from processing and the virtual thread will be initialized by resetting the processed flags of all icons in the thread. The virtual thread will then be processed to completion, and the iteration thread will be unblocked.

If the icon is one that performs a subprogram, the thread containing the subprogram (calling) icon will be blocked from processing and the subthread will be initialized by resetting the processed flags of all the icons in the subthread. The subthread will then be processed to completion, and the subprogram (calling) thread will be unblocked.

After performing the functions, block 510 will set the processed flag for the icon, so that it will not process a second time, and transfer to block 512. Block 512 sends output data generated by processing the functions of the icon to all icons connected to the data output pins. Block 514 then schedules all the icons connected to the data outputs by placing the icons on the pending queue for the thread, if they are not already on the queue, and if they are not on the done stack. If an icon has multiple output pins, the icons connected to the top pin will be placed on the queue first, then the next pin down, etc. The order for placing icons connected to the same pin is undefined, and they may be placed on the queue in any order. Block 516 then places this icon on the done stack, and block 518 removes this icon from the pending queue, before returning to FIG. 4.

Figure 6:
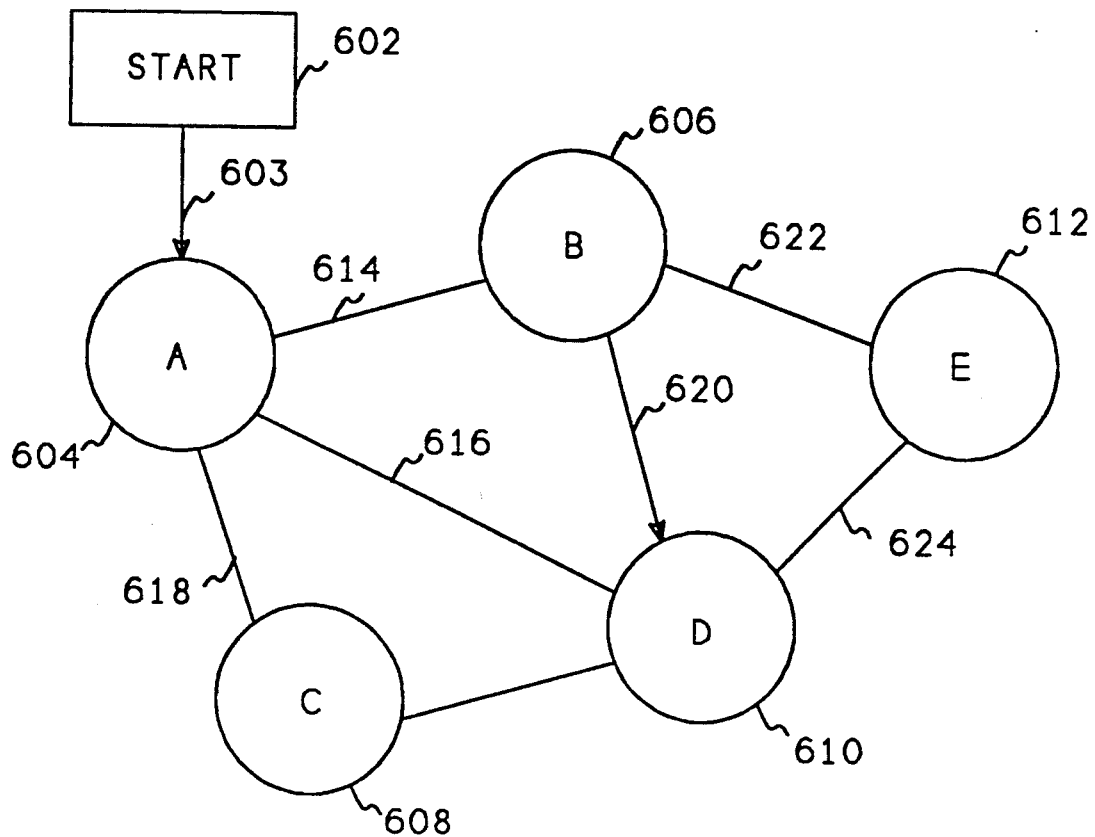
FIG. 6 shows an example of an iconic network.

FIG. 6 shows an example of an iconic network. FIG. 6 will be used to illustrate the flow through the flowcharts of FIGS. 3, 4, and 5, and to further illustrate the Icon Device Rules of Table 1 and the Thread Rules of Table 2. Referring now to FIG. 6 as well as FIGS. 3, 4, and 5, when a user uses the mouse 110 (FIG. 1) to "push" the start icon 602, FIG. 3 is called to perform the pre-run process on the graphical network of FIG. 6. Block 302 determines that all input pins are connected and block 304 determines that no pins have multiple connections. Block 306 finds the start icon 602, so block 308 puts the start icon 602 onto the pending queue. Block 314 then calls FIG. 4 to process the graphical network of FIG. 6.

Block 402 points to the pending queue and done stack for the thread of FIG. 6, which is the only thread contained in the graphical network. Block 404 then determines that the pending queue is not empty, so block 406 gets the start icon 602 from the pending queue, and block 408 calls FIG. 5 to process the start icon. Block 502 determines that there is no sequence input to the start icon and block 506 determines that there are no data input pins connected, which is the same as having data available on all input pins. Therefore, block 510 performs the function of the start, which is a no-op, and block 512 and 514 perform no functions since there is no data output from the start icon. Block 516 pushes the start icon onto the done stack, and block 518 removes the start icon from the pending queue. Control then returns to block 402 which points to the same thread. Block 404 determines that the pending queue is empty, so control transfers to block 410 which determines that the done stack is not empty, so block 412 pops the start icon from the done stack. Block 414 determines that the start block does have a sequence output, indicated by the arrowhead connection 603, so block 415 sends a sequence signal to the sequence input of icon A 604 and block 416 puts icon A 604 onto the pending queue. Control then returns to block 402 to process icon A 604.

At this point, the pending queue has icon A 604 as its only entry, and the done stack is empty. Block 402 points to the same thread, and block 404 determines that the pending queue is not empty, so block 406 gets the A icon 604 from the pending queue and block 408 calls FIG. 5 to process this icon. Block 502 determines that the A icon does have a sequence input connected, and block 504 determines that the sequence input has received a signal, since a signal was supplied when the start icon was popped from the done stack. Control transfers to block 510 which performs whatever function the A icon represents, and block 512 sends data output to the B icon 606, D icon 610, and to the C icon 608. Block 514 then puts the B icon 606, C icon 608 and D icon 610 onto the pending queue. Note that under Thread Rule 2 (Table 2) the order of placing the B, C, and D icons on the pending queue is undefined, since these icons are connected in parallel. Therefore, the above described order is coincidental. Block 516 then pushes the A icon onto the done stack, and block 518 removes the A icon 604 from the pending queue. Control then returns to block 402.

At this point, the pending queue contains icons B 606, C 608, and D 610, and the done stack contains icon A 604. Block 402 then points to the same thread, and block 404 determines that the pending queue is not empty, so block 406 retrieves the next element from the pending queue, which is the B icon 606. Block 408 then calls FIG. 5 which processes the B icon by sending data to the E icon 612, placing the E icon 612 on the pending queue, placing the B icon 606 on the done stack, and deleting the B icon 606 from the pending queue. Control then returns to block 402.

At this point, the pending queue has icon C 608, icon D 610, and icon E 612. The done stack has icon A 604 and icon B 606. The pending queue is not empty, so block 406 pulls the C icon 608 from the pending queue and block 408 calls FIG. 5 to process the C icon 608. FIG. 5 processes the C icon 608 by sending data to the D icon 610. Block 514 of FIG. 5 does not, however, place icon D on the pending queue, because icon D is already present on the pending queue. The C icon 608 is placed on the done stack and deleted from the pending queue and control returns to block 402.

At this point, the pending queue has the D icon 610 and the E icon 612. The done stack has the A icon 604, B icon 606, and the C icon 608. Again, block 402 points to this thread, block 404 determines that the queue is not empty, block 406 pulls the D icon 610 from the pending queue, and block 408 calls FIG. 5 to process the D icon 610. Block 502 determines that the D icon does have a sequence input connected, so it transfers to block 504. Block 504 determines that the sequence input of the D icon 610 has not yet received a signal, so control transfers to block 508 which puts the B icon on the pending queue before transferring to block 518 which removes the D icon from the pending queue. Control then returns to block 402.

Block 402 points to the current thread and block 404 determines that the pending queue is not empty, so block 406 pulls the E icon from the pending queue and block 408 calls FIG. 5 to process the E icon 612. Block 502 determines that the E icon 612 does not have a sequence input, so control transfers to block 506 which determines that data is not available on all input pins for the E icon 612. The B icon 606 has already fired, but the D icon 610 has not yet fired, so the E icon 612 does not yet have all of its data. Therefore, block 506 transfers to block 508 which puts the D icon 610 onto the pending queue because the D icon has not yet supplied data to the E icon. Control goes to block 518 which removes icon E from the pending queue and control returns to block 402.

Block 402 points to the current thread and block 404 determines that the pending queue is not empty, so block 406 pulls the B icon from the pending queue and block 408 calls FIG. 5 to process the B icon. Block 502 determines that the B icon 606 has already been processed, so block 501 transfers to block 518 which simply removes the B icon from the pending queue.

At this point, the pending queue has the D icon 610 as its only element, and the done stack has the A icon 614, B icon 606, and C icon 608. Block 402 points to this thread and block 404 determines that the queue is not empty, so block 406 pulls the D icon from the pending queue, and block 408 calls FIG. 5 to process the D icon again. Processing is the same as described above for the D icon, and because it does not have a signal on its sequence input it does nothing and is simply removed from the pending queue before control returns to block 402.

At this point, the pending queue is empty and the done stack has the icons A 604, B 606, and C 608. Block 402 points to the current thread and block 404 determines that the pending queue is empty, so control transfers to block 410 which finds that the done stack is not empty, so block 412 pops the C icon 608 from the done stack, and block 414 determines that the C icon 608 does not have a sequence output, so control goes back to block 410 and on to block 412. Block 412 then pops the B icon 606 from the done stack, and block 414 determines that the B icon 606 does have a sequence output, arrowhead connection 620, so block 415 sends a sequence signal over arrowhead connection 620 to the D icon 610 and block 416 places the D icon onto the pending queue before control returns to block 402.

At this point, the pending queue contains the D icon 610, and the done stack contains the A icon 604. Block 402 points to the same thread and block 404 finds that the pending queue is not empty, so block 406 pulls the D icon 610 from the pending queue, and block 408 calls FIG. 5 to process the D icon 610. Block 502 finds that the D icon 610 does have a sequence input connected, and transfers to block 504 which finds that the sequence input has received a signal, because of the process of popping B from the done stack, as described above. Therefore, control transfers to block 510 which performs the functions of the D icon and block 512 sends data output to the E icon. Block 514 then places the E icon onto the pending queue, block 516 places the D icon on the done stack, and block 518 deletes the D icon from the pending queue before returning control to block 402.

Block 402 points to the same thread, and block 404 finds the pending queue is not empty, so block 406 gets the E icon from the pending queue and block 408 calls FIG. 5 to process the E icon. FIG. 5 finds that the E icon has data available on all of its input pins, so its functions are performed, and it is placed on the done stack, and deleted from the pending queue before returning to block 402.

Block 402 points to this thread and block 404 determines that the pending queue is empty, so control transfers to block 410 which finds that the done stack is not empty. Block 412 then pops the E icon 612 from the done stack, and block 414 determines that the E icon 612 does not have a sequence output so control transfers to block 410. Block 410 finds that the done stack is still not empty, so block 412 pops the D icon 610 from the done stack, and block 414 finds that D icon 610 has no sequence output, so block 414 transfers back to block 410. Again, block 410 finds that the done stack is not empty, so block 412 now pops the A icon 604 from the done stack and block 414 finds that the A icon 601 has no sequence output, so block 414 transfers back to block 410. Block 410 now finds that the done stack is empty, so control transfers to block 418 which determines that the only thread of FIG. 6 is no complete, and returns to FIG. 3 which also returns to its caller.

Figure 7:
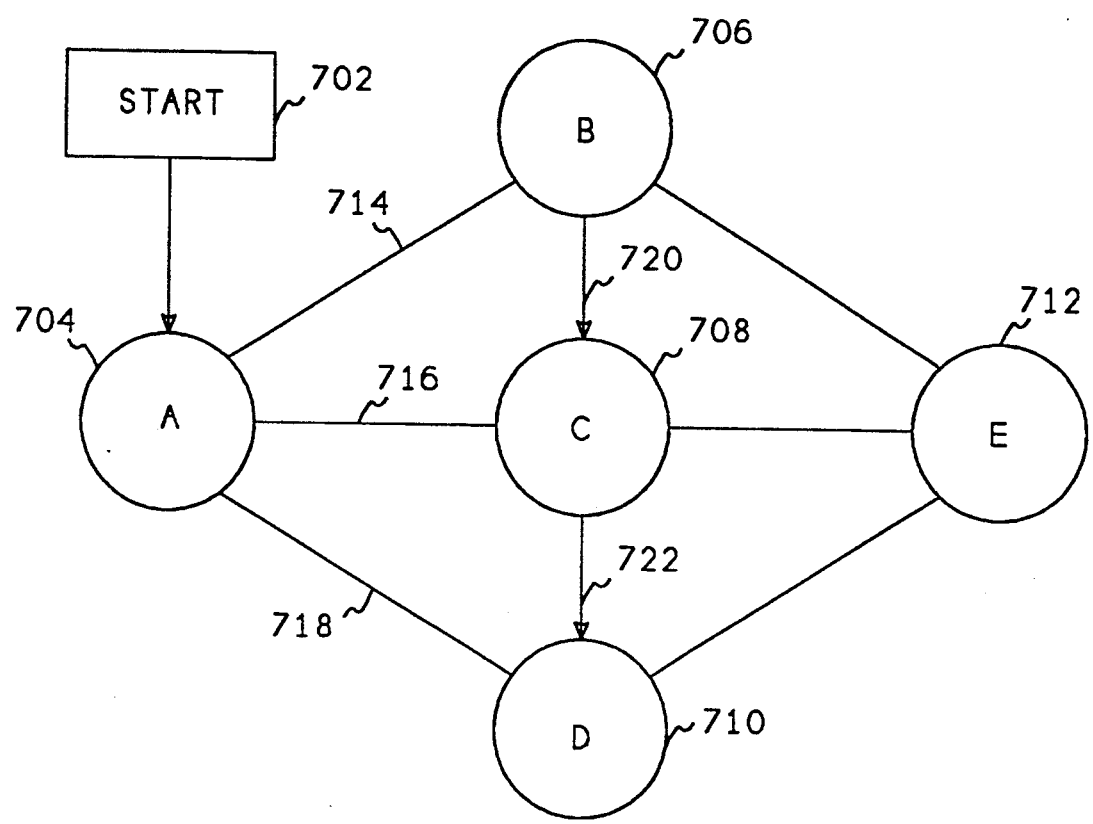
FIG. 7 shows an example of an iconic network forcing a particular order of processing.

FIG. 7 shows another example of an iconic network. The example of FIG. 7 shows a specific sequence for processing some of the icons. Referring now to FIG. 7, after the user "pushes" the start icon 702, it will fire sending a sequence signal to the A icon 704. The A icon 704 will fire, sending data to the B icon 706, C icon 708, and D icon 710. This processing will be done in the manner described earlier with reference to FIGS. 3, 4, and 5. The arrowhead sequence connection 720 between B icon 706 and C icon 708 requires that the B icon 706 processes before the C icon 708. If the sequence connection 720 was absent, this order of processing would be indeterminate. Likewise, the sequence connection 722 between C icon 708 and D icon 710 forces the C icon 708 to be processed before the D icon 710. After the B icon 706, C icon 708, and D icon 710 have all processed, the E icon 712 can then process.

Figure 8:
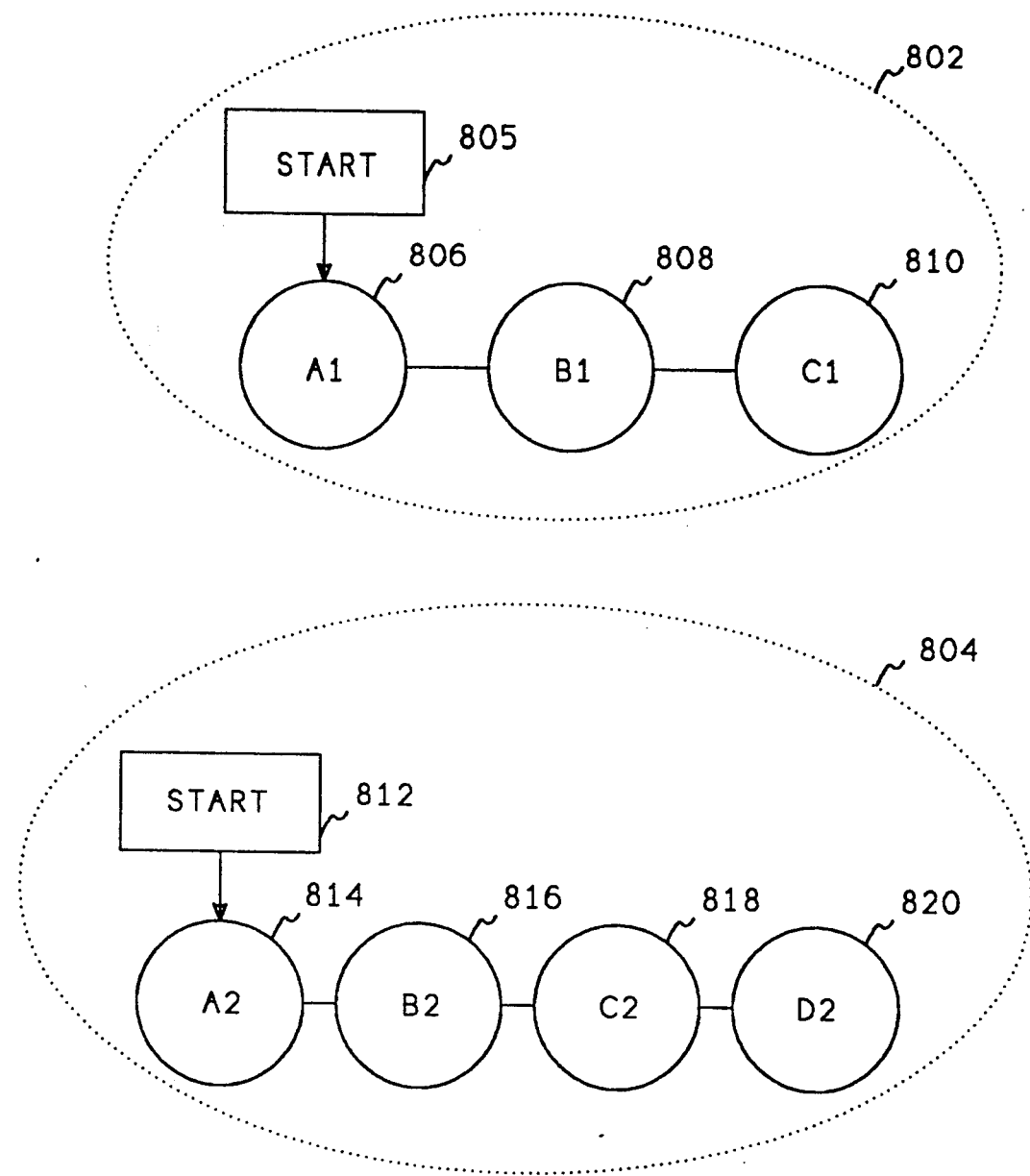
FIG. 8 shows an example of an iconic network having two threads.

The diagram of FIG. 8 shows an iconic network having two threads. Referring now to FIG. 8, a thread 802 is comprised of a start icon 805, icon A1 806, icon B1 808, and icon C1 810. Another thread 804 is comprised of a start icon 812, icon A2 814, icon B2 816, icon C2 818, and icon D2 820. The invention will treat these two threads as a circular list, such that after processing thread 804, processing will continue with thread 802. The order of the threads is undetermined, and either thread may start processing first. For the following, it will be assumed that the thread 802 is the first to start processing. While processing the iconic network of FIG. 8, block 402 (FIG. 4) will satisfy Thread Rule 8 ( Table 2) by processing an icon from thread 802 and then pointing to thread 804. After an icon from thread 804 has been processed, block 402 will point back to the pending queue and done stack of thread 802 to process one icon from that thread. This alternating will continue until icon C1 810 has been processed. At this point, thread 802 will be completely processed, and block 402 will continue to point to thread 804 until it has completed its processing, at which point processing will terminate.

As shown in the example described above, with reference to FIG. 6, 7 and 8, an icon will "fire" only once when all of its input data and/or its sequence input has been satisfied. This rule must be altered, however, for iteration icons such a icon 306 of FIG. 2. When an iteration icon is encountered, all of the icons connected to its data outputs are copied into a "virtual thread". For each iteration of the iteration icon, the thread containing the iteration icon will be blocked from processing to allow the virtual thread to be processed in the manner described with respect to FIGS. 3, 4, and 5. After the processing is completed for the virtual thread, it will be deleted and the iteration icon will be unblocked to repeat for the next iteration. With the next iteration, the virtual thread will be recreated, processed, and deleted. This will continue until all iterations of the iteration icon have been completed, at which time the sequence output of the iteration icon will be fired and the icons connected to the sequence output will be processed in the normal manner.

When a subprogram icon is encountered, all of the icons below the subprogram icon are included in a subthread. The thread containing the subprogram (calling) icon will be blocked from processing to allow the subthread to be processed in the manner described with respect to FIGS. 3, 4, and 5. After the processing is completed for the subthread, the thread containing the subprogram (calling) icon will be unblocked.

Figure 9:
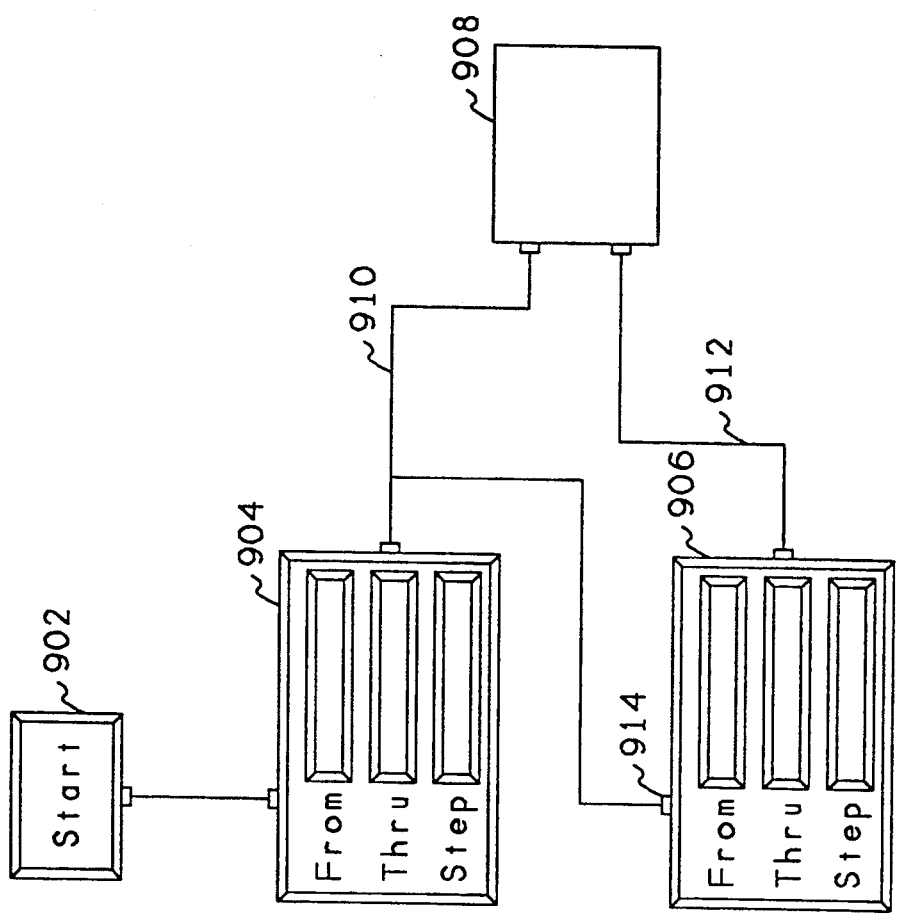
FIG. 9 shows an example of an iconic network having two iteration icons.

FIG. 9 shows an iconic network having two iteration icons, and illustrates an exception to the rule requiring an icon to have data available on all data inputs before firing. Referring now to FIG. 9, when the user activates the network, the start icon will fire a sequence signal to iteration icon 904. Iteration icon 904 will sent data over connection 910 to icon 908 and also to the sequence input 914 of iteration icon 906. Because of the connections between the iteration icons, icon 906 will process all its iterations each time iteration 904 fires once. Therefore, icon 908 is on two virtual threads, one from icon 904 and one from icon 906. Under the rules described above, icon 908 would only fire once for each iteration of icon 904 and the first iteration of icon 906, because data would only be available when both icon 904 and icon 906 had just fired. Although icon 906 would fire several times for each iteration of icon 904, the data from connection 910 would have been used up with the first firing of icon 908 and it would not fire again until icon 904 had fired again. The system detects this condition and allows the data o connection 910 to be reused by icon 908, thus allowing icon 908 to fire every time icon 906 supplies data. For example, if icon 904 iterates five times, and icon 906 iterates four times (each time it receives a signal on its sequence input 914), icon 908 will fire twenty times.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

Icon Device Rules

1. All input pins must be connected; output pin connections are optional.
2. Input pins allow only one trace connection per pin; output pins allow one or more trace connections per pin.
3. A device executes only when each input pin has received data.
4. If the Sequence input is connected, the device will execute only after this input has receive a signal.
5. Sequence Out fires (sends a sequence signal) only after all other data output pins have fired, and even then only after propagation, along-all standard output lines, has continued as far as possible.

TABLE 2

Thread Rules

1. A device which is connected to another device is considered to be on the same thread as that device, thus an unconnected device is its own thread.
2. Devices which are connected in parallel directly to the output of any other device will not be guaranteed to execute in any particular or even the same order from one load of the program to the next.
3. Execution can be "pulled" across data and sequence connections as well as "pushed".
4. A device that has no input connections, and thus no sequential constraints, but does have one or more output connections will be executed only when "pulled" across one of its output lines unless no start icon device is present o the thread--in which case it may be executed at an unpredictable time prior to being "pulled" from the next device.
5. Start icon devices are not required for a thread unless a feedback loop is present on the thread. If a feedback loop is present, a start icon device is required in order to guarantee normal order of execution (a user will be told of the need for a start icon, at run time, if a feedback loop is detected and no start icon is present).

6. Multiple start devices on the same thread result in multiple entry points for the thread; all start icons will fire before any other icon devices on the thread. The order of execution of the several start icons will not be guaranteed, nor will the order of execution from one load of the program to the next.

7. Execution of a thread having no start icon device will proceed "correctly" as far as the sequencing constraints implied by the device connections, but the order of execution of two or more independent and parallel subthreads will not be predictable.

8. Parallel threads are executed in round-robin style with each thread getting the processor for one primitive icon per cycle, excluding iteration icons and any form of multiple icon construct such as an iconic subprogram.

What is claimed is:

1. In an iconic programming system executing in a computer system, wherein each icon in said programming system may have zero or more data input connections and zero or more data output connections, and wherein said icons are graphically connected together by a user of the computer system graphically connecting data output connections to data input connections to form a network of icons, a computer implemented method for processing said icons of said network to perform data processing functions represented by said icons, said computer implemented method for processing comprising the steps of:

(a) programmatically examining all icons within said network and discontinuing processing if all data input connections of all said icons are not connected to a data output connection of another icon;
   (b) programmatically examining all icons within said network and discontinuing processing if any data input connection of any of said icons is connected to a data output connection of more than one other icon;
   (c) programmatically examining all icons within said network and programmatically scheduling all start icons in said network to be processed before processing any other icons;
   (d) when processing an icon, programmatically scheduling, for processing, all icons connected to data output connections of said icon being processed;
   (e) when processing an icon, if said icon contains data input connections that have not received data, discontinuing processing of said icon and programmatically scheduling, for processing, all icons connected to said data input connections that have not received data; and
   (f) processing each icon of said network of icons after said icon is scheduled and said icon has received data on all data input connections of said icon.

2. The computer implemented method for processing of claim 1 wherein step (c) further comprises the step of:
   (c1) if said network does not contain any start icons, scheduling all icons in said network for processing.

3. The computer implemented method for processing of claim 1 wherein step (c) further comprises the step of examining said network and discontinuing processing if said network contains one or more feedback loops, wherein a data output of a first icon connects directly or through at least one other icon to a data input of said first icon, and said network does not contain at least one start icon.

4. In an iconic programming system executing in a computer system, wherein each icon in said programming system may have zero or more data input connections, zero or more data output connections, an optional sequence input connection and an optional sequence output connection, and wherein said icons are graphically connected together by a user of the computer system graphically connecting data output connections and sequence output connections of icons to data input connections and to sequence input connections of other icons to form a network of icons, a computer implemented method for processing said icons of said network to perform data processing functions represented by said icons, said computer implemented method for processing comprising the steps of:

(a) programmatically placing all start icons in said network of icons into a pending queue to cause said start icons to be processed before processing any other icons;
   (b) processing a next icon from said pending queue comprising the steps of
      (b1) if said next icon has a sequence input connection and said sequence input connection has received a signal from a sequence output connection of another icon, and each data input connection of said next icon has had data transferred to said data input connection from a data output connection of another icon, processing said next icon comprising the steps of
         (b1a) programmatically executing any data processing functions defined for said next icon,
         (b1b) transferring output data, created by programmatically executing said data processing functions defined for said next icon, to all icons connected to data output connections of said next icon, and
         (b1c) programmatically placing all icons connected to said data output connections of said next icon into said pending queue for subsequent processing, and
      (b2) if said next icon has no sequence input connection and each data input connection of said next icon has had data transferred to said data input connection from a data output connection of another icon, processing said next icon comprising the steps of
         (b2a) programmatically executing any data processing functions defined for said next icon,
         (b2b) transferring output data, created by programmatically executing said data processing functions defined for said next icon, to all icons connected to data output connections of said next icon, and
         (b2c) programmatically placing all icons connected to said data output connections of said next icon into said pending queue for subsequent processing, and
      (b3) if said icon has no sequence input connection and contains one or more data input connections that have not received data, programmatically placing all icons connected to said one or more data input connections that have not received data into said pending queue; and
      (b4) if said icon has a sequence input connection that has not received a sequence signal from a sequence output connected from another icon, programmatically placing said another icon into said pending queue;

(c) repeating step (b) until sad pending queue is empty.

5. The process of claim 4 further comprising the following steps wherein the following step (b5) is performed after step (b4) and wherein the following steps (d) through (h) are performed after step (c):
- (b5) if said icon was processed by step (b1) or step (b2), programmatically placing said icon at a top location on a done stack;
- (d) removing at one icon from a top location of said done stack;
- (e) programmatically sending a sequence signal to all icons connected to a sequence output connection of said top icon;
- (f) programmatically placing all icons connected to said sequence output connection of said top icon into said pending queue;
- (g) if said pending queue is not empty, continuing with step (b); and
- (h) if said done stack is not empty, continuing with step (d).

6. The process of claim 4 wherein step (a) further comprises the step of:
- (a1) if said network of icons does not contain any start icons, placing all icons in said network into said pending queue.

7. The process of claim 4 wherein step (a) further comprises the step of:
- (a1) programmatically examining said network of icons and discontinuing processing if said network of icons contains one or more feedback loops, wherein a data output connection of a first icon is connected directly or through at least one other icon to a data input connection of said first icon, and said network of icons does not contain at least one start icon.

8. In an iconic programming system executing in a computer system, wherein each icon in said programming system may have zero or more data input connections, zero or more data output connections, an optional sequence input connection and an optional sequence output connection, and wherein said icons are graphically connected together by a user of the computer system graphically connecting data output connections and sequence output connections of icons to data input connections and to sequence input connections of other icons to form at least one network of icons, a computer implemented method for processing said icons of said network to perform data processing functions represented by said icons, said computer implemented method for processing comprising the steps of:
- (a) programmatically separating said icons into a list of connected icon threads comprising the steps of
  - (a1) selecting a first icon for a thread,
  - (a2) selecting all icons connected to data output connections or sequence output connections of said first icon for said thread,
  - (a3) repeating step (a2) for all icons selected in step (a2), and
  - (a4) repeating steps (a1) through (a3) if unselected icons remain in said network of icons;
- (b) programmatically creating a pending queue and a done stack for each of said threads;
- (c) programmatically placing all start icons selected for each of said threads into said pending queue for said thread;
- (d) selecting one of said threads for processing,
- (e) if said pending queue of said selected thread is not empty, selecting a next icon form said pending queue and processing said next icon comprising the steps of
  - (e1) if said next icon has a sequence input connection and said sequence input connection has received a signal from a sequence output connection of another icon, and each data input connection of said next icon has had data transferred to said data input connection from a data output connection of another icon, processing said next icon comprising the steps of
    - (e1a) programmatically executing any data processing functions defined for said next icon,
    - (e1b) transferring output data, created by programmatically executing said data processing functions defined for said next icon, to all icons connected to data output connections of said next icon, and
    - (e1c) programmatically placing all icons connected to said data output connections of said next icon into said pending queue for subsequent processing, and
  - (e2) if said next icon has no sequence input connection and each data input connection of said next icon has had data transferred to said data input connection from a data output connection of another icon, processing said next icon comprising the steps of
    - (e2a) programmatically executing any data processing functions defined for said next icon,
    - (e2b) transferring output data, created by programmatically executing said data processing functions defined for said next icon, to all icons connected to data output connections of said next icon, and
    - (e2c) programmatically placing all icons connected to said data output connections of said next icon into said pending queue for subsequent processing;
  - (e3) if said icon contains one or more data input connections that have not had data transferred thereto, programmatically placing all icons connected to said data input connections that have not had data transferred thereto on said pending queue,
  - (e4) if said icon contains a sequence input connection that has not received a signal from a sequence output connection of another icon, programmatically placing said another icon connected to said sequence input connection into said pending queue, and
  - (e5) if said icon was processed by step (e1) or step (e2), placing said icon at a top location on said done stack of said selected thread;
- (f) if said pending queue for said selected thread is empty and said done stack of said selected thread is not empty, processing said thread comprising the steps of
  - (f1) removing a top icon from a top location of said done stack,
  - (f2) programmatically sending a sequence signal to all icons connected to a sequence output connection of said top icon, and
  - (f3) programmatically placing all icons connected to said sequence output connection of said top icon on said pending queue of said selected thread; and (g) repeating steps (d) through (f) until all pending queues and all done stacks created in step (b) are empty.

9. The process of claim 8 wherein step (c) further comprises the step of:
(c1) if a thread does not contain any start icons, placing all icons in said thread on said pending queue of said selected thread.

10. The process of claim 8 wherein step (c) further comprises the step of:
(c1) programmatically examining each of said threads and discontinuing processing if any thread contains one or more feedback loops, wherein a data output connection of a first icon connects directly or through at least one other icon to a data input connection of said first icon, and said thread does not contain at least one start icon.

11. In an iconic programming system executing in a computer system, wherein each icon in said programming system may have zero or more data input connections, zero or more data output connections, an optional sequence input connection and an optional sequence output connection, and wherein said icons are graphically connected together by a user of the computer system graphically connecting data output connections and sequence output connections of icons to data input connections and to sequence input connections of other icons to form at east one network of icons, a computer implemented method for processing said icons of said network to perform data processing functions represented by said icons, said computer implemented method for processing comprising the steps of:
(a) programmatically separating said icons into a list of connected icon threads comprising the steps of
(a1) selecting a first icon for a thread,
(a2) selecting all icons connected to data input connections or sequence input connections of said first icon for said thread,
(a3) repeating step (a2) for al icons selected in step (a2), and
(a4) repeating steps (a1) through (a3) if unselected icons remain in said network of icons;
(b) programmaticallyy creating a pending queue and a done stack for each of said threads;
(c) programmatically placing all start icons selected for each of said threads into said pending queue for said thread;
(d) selecting one of said threads for processing,
(e) if said pending queue of said selected thread is not empty, selecting a next icon from said pending queue and processing said icon comprising the steps of
(e1) if said icon is an iteration icon, placing all icons connected, directly or through at least one other icon, to data output connections of said icon into a virtual thread, blocking any further processing of said selected thread, placing said virtual thread onto said list of threads, selecting said virtual thread for processing, then continuing with step (e),
(e2) if said icon is a subprogram icon, placing all icons below said subprogram icon into a subthread blocking any further processing of said selected thread, pacing said subthread onto said list of threads, selecting said subthread for processing, then continuing with step (e),
(e3) if said next icon has a sequence input connection and said sequence input connection has received a signal from a sequence output connection of another icon, and each data input connection of said next icon has had data transferred to said data input connection from a data output connection of another icon, processing said next icon comprising the steps of
(e3a) programmatically executing any data processing functions defined for said next icon,
(e3b) transferring output data, created by programmatically executing said data processing functions defined for said next icon, to all icons connected to data output connections of said next icon, and
(e3c) programmatically placing all icons connected to said data output connections of said next icon into said pending queue for subsequent processing, and
(e4) if said next icon has no sequence input connection and each data input connection of said next icon has had data transferred to said data input connection from a data output connection of another icon, processing said next icon comprising the steps of
(e4a) programmatically executing any data processing functions defined for said next icon,
(e4b) transferring output data, created by programmatically executing said data processing functions defined for said next icon, to all icons connected to data output connections of said next icon, and
(e4c) programmatically placing al icons connected to said data output connections of said next icon into said pending queue for subsequent processing;
(e5) if said icon contains one or more data input connections that have not had data transferred thereto, programmatically placing all icons connected to said data input connections that have not had data transferred thereto on said pending queue of said selected thread,
(e6) if said icon contains a sequence input connection that has not received a signal, programmatically placing an icon connected to said sequence input connection into said pending queue of said selected thread, and
(e7) if said icon was processed by step (e3) or step (e4), placing said icon at a top location on said done stack of said selected thread;
(f) if said pending queue of said selected thread is empty and said done stack of said selected thread is not empty, processing said thread comprising the steps of
(f1) removing a top icon from a top location of said done stack of said selected thread,
(f2) programmatically sending a sequence signal to all icons connected to a sequence output connection of said top icon, and
(f3) programmatically placing all icons connected to said sequence output connection of said icon on said pending queue of said selected thread; and
(g) if said pending queue of said selected thread is empty and said done stack of said selected thread is empty, processing said thread comprising the steps of
(g1) if said selected thread is a virtual thread, removing said selected thread forms said list of threads and unblocking said thread containing said iteration icon from which said virtual thread was created hereby said thread containing said iteration icon is allowed to continue processing, and (g2) if said thread is a subthread, unblockings said thread containing said subprogram icon that called said subthread and placing said subprogram icon on said done stack, whereby said thread containing said subthread icon is allowed to continue processing; and (h) repeating steps (d) through (g) until all said pending queues and all said done stacks of all said threads are empty.

12. The process of claim 11 wherein step (c) further comprises the step of:

(c1) if a thread does not contain any start icons, placing all icons in said thread on said pending queue of said selected thread.

13. The process of claim 11 wherein step (c) further comprises the step of:

(c1) programmatically examining each of said threads and discontinuing processing if any thread contains one or more feedback loops, wherein a data output of a first icon connects directly or through at least one other icon to a data input of said first icon, but does not contain at least one start icon.

* * * * *